United States Patent [19]

Kubo et al.

[11] Patent Number: 5,093,889
[45] Date of Patent: Mar. 3, 1992

[54] OPTICAL FIBERS WITH TERPOLYMER CLADDING

[75] Inventors: Motonobu Kubo, Minoo; Hiroshi Inukai, Takatsuki; Takahiro Kitahara, Suita, all of Japan

[73] Assignee: 501 Daikin Industries, Ltd., Osaka, Japan

[21] Appl. No.: 469,268

[22] Filed: Jan. 24, 1990

[30] Foreign Application Priority Data

Jan. 24, 1989 [JP] Japan .................................. 1-15821

[51] Int. Cl.$^5$ .............................................. G02B 6/16
[52] U.S. Cl. ...................................... 385/145; 385/142
[58] Field of Search ............... 350/96.30, 96.31, 96.32, 350/96.34; 385/141, 142, 143, 144, 145, 123, 124, 125, 126, 127, 128

[56] References Cited

U.S. PATENT DOCUMENTS

| | | | |
|---|---|---|---|
| 4,138,194 | 2/1979 | Beasley et al. | 350/96.30 |
| 4,298,245 | 11/1981 | Aulich et al. | 350/96.30 X |
| 4,530,569 | 7/1985 | Squire | 350/96.34 |
| 4,564,263 | 1/1986 | Meba et al. | 350/96.34 |
| 4,977,008 | 12/1990 | Squire | 428/421 |
| 4,977,025 | 12/1990 | Squire | 428/421 |

Primary Examiner—John D. Lee
Assistant Examiner—Phan T. Heartney
Attorney, Agent, or Firm—Larson and Taylor

[57] ABSTRACT

The invention provides an optical fiber comprising a cladding and a core wherein the cladding comprises a terpolymer comprising:
(1) about 50 to about 90 mol. % of vinylidene fluoride,
(2) about 8 to about 45 mol. % of trifluoroethylene and
(3) about 2 to about 15 mol. % of hexafluoropropylene or perfluoro(alkylvinylether).

8 Claims, No Drawings

OPTICAL FIBERS WITH TERPOLYMER CLADDING

FIELD OF THE INVENTION

This invention relates to optical fibers comprising a core and a cladding formed from a specific fluorine-containing copolymer.

BACKGROUND OF THE INVENTION

In the conventional plastic optical fibers comprising a core of polymethylmethacrylate (PMPA), polycarbonate or like polymer, vinylidene fluoridetetrafluoroethylene copolymer (Japanese Examined Patent Publication No.21600/1978), fluoroalkylmethacrylate copolymer (Japanese Examined Patent Publication No. 8978/1968) and the like are usually used as a cladding.

The vinylidene fluoride-tetrafluoroethylene copolymers having good adherence to PMMA as the core and high flexibility, however, have the drawbacks of being low in working temperature of up to about 70° C. and relatively high in transmission loss of about 200 dB/km due to the crystalline structure of the polymers.

The fluoroalkylmethacrylate copolymers are low in transmission loss due to high transparency of the polymers and have improved working temperature of about 85° C. However, the fluoroalkylmethacylate copolymers have the drawback of being low in adherence to the PMMA core which results in the poor flexibility of the optical fibers.

SUMMARY OF THE INVENTION

An object of the invention is to provide optical fibers which can be used at elevated temperatures.

Another object of the invention is to provide optical fibers in which the core and the cladding are strongly adhered.

Still another object of the invention is to provide optical fibers which is low in transmission loss.

Other objects and features of the invention will become apparent from the following description.

The present invention provides an improvement in an optical fiber comprising a cladding and a core wherein the cladding comprises a terpolymer comprising:

(1) about 50 to about 90 mol. % of vinylidene fluoride,
(2) about 8 to about 45 mol. % of trifluoroethylene and
(3) about 2 to about 15 mol. % of hexafluoropropylene or perfluoro(alkylvinylether).

DETAILED DESCRIPTION OF THE INVENTION

The polymer used as the cladding material in the invention is a terpolymer produced from the monomer components (1), (2) and (3) in the ratio as indicated above.

Trifluoroethylene in amounts of about 8 to about 45 mol. % in the polymer is effective mainly in lowering the refractive index of the cladding. When the excess amount of trifluoroethylene is used, the optical fibers tend to be colored when the fibers are spun whereas the use thereof in less than 8 mol. % leads to the formation of highly crystalline structure of the polymer. In either case, the high transparency required of the cladding of optical fibers cannot be achieved.

Hexafluoropropylene or perfluoro-(alkylvinylether) mainly contributes to the repression of crystal formation in the polymer. The polymer containing in excess of 15 mol. % of hexafluoropropylene or perfluoro(alkylvinylether) tends to show rubber-like properties and is low in heat resistance. When the amount of hexafluoropropylene or perfluoro(alkylvinylether) is less than 2 mol. %, the optical fibers are low in light transmittance.

Preferable examples of perfluoro-(alkylvinylether) are:

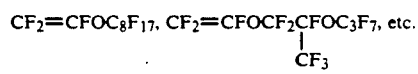

Among these ethers, $CF_2=CFOC_3F_7$ [perfluoro-(propylvinylether)] is most preferred because of the ease of production.

The fluorine-containing terpolymer of the invention useful as the cladding material can be prepared by conventional radical polymerization processes such as suspension, solution, emulsion, bulk polymerization methods. The polymerization temperature is usually in the range of 0° to 150° C., preferably 5° to 95° C. The pressure to be employed for polymerization is in the range of 0 to 50 kg/cm².

Examples of media useful, for example, in suspension polymerization are fluorine compounds such as 1,1,2-trichloro-1,2,2-trifluoroethane, 1,2-dichloro-1,1,2,2-tetrafluoroethane, etc.; acetates such as ethyl acetate, n-butyl acetate, etc.; ketones such as methyl isobutyl ketone, etc.; water.

Polymerization initiators useful for conducting suspension, solution, bulk polymerization processes are organic peroxides such as di-isopropylperoxy dicarbonate, isobutyryl peroxide, undecafluoroheptyryl peroxide, heptafluorobutyryl peroxide, etc. Initiators useful for emulsion polymerization are redox initiators consisting of oxidizing agents such as ammonium persulfate, potassium persulfate and like persulfates and reducing agents such as sodium sulfite, iron (II) sulfate and like salts of transition metals. Among these polymerization methods, suspension polymerization is preferred in order to avoid the degradation of properties as optical fibers due to the contamination of the polymer with emulsifying agents, etc.

A chain transfer agent may be used to adjust or regulate the molecular weight of the polymer of the invention. Chain transfer agents to be used in the invention are not particularly limited and include acetone and like ketones; ethyl acetate and like esters; methanol and like alcohols; dodecylmercaptan and like mercaptans, etc. Among these chain transfer agents, ketones, esters and like have a function as solvent in producing copolymers of low molecular weight.

The optical fibers of the invention are produced by a conventional composite extrusion process of the core and the cladding. For use as the cladding material in the composite extrusion process, the terpolymer of the invention preferably has a melt flow index (MI) of about 2 to about 100 (g/10 min.) and an intrinsic viscosity $[\eta]$ of about 0.2 to about 2.0 (in methylethylketone at 35° C.) and more preferably has a MI of about 10 to about 50 and an intrinsic viscosity $[\eta]$ of about 0.4 to about 1.0. When the MI is excessively high, the mechanical properties of the terpolymer are too low and the flexibility of the optical fibers is impaired. When the MI is too low, the fibers are difficult to produce by extrusion.

As is known, the cladding material of the optical fibers must be lower by at least 2% in refractive index than the core material. Therefore, the terpolymer of the invention preferably has a refractive index of about 1.35 to about 1.42, more preferably about 1.37 to about 1.41, in view of the refractive index of PMMA (about 1.49) which is usually used as the core material.

The terpolymer of the invention can be used as the cladding in combination with other core materials than PMMA. Examples of such core materials are quartz glass, multicomponent glass and like glass materials. When applied to the glass core, the terpolymer is used in the form of a solvent solution. Examples of the solvents are acetone, methyl ethyl ketone, methyl isobutyl ketone, ethyl acetate, tetrahydrofuran, dioxane, dimethylformamide, dimethylacetamide, etc.

The terpolymer used in the invention is excellent in heat resistance and adhesion to the core material. Thus, the optical fiber of the invention is low in transmission loss.

The present invention will be described below in more detail with reference to the following reference examples, examples and comparison example.

REFERENCE EXAMPLE 1

Into a 40-1 autoclave equipped with a stirrer was placed 8 l of water. After the deaeration and nitrogen replacement were repeated three times, 9 l of trichlorotrifluoroethane (hereinafter referred to as "R-113"), 1,184 g of hexafluoropropylene (hereinafter referred to as "6F"), 535 g of trifluoroethylene (hereinafter referred to as "3FH") and 1,752 g of vinylidene fluoride (hereinafter referred to as "2F") were introduced into the autoclave one after another and the mixture was maintained at a temperature of 17° C. To the mixture was then added 50 ml of ethyl acetate as chain transfer agent and 25 g of undecafluoroheptyryl peroxide (hereinafter referred to as "DHP") as polymerization initiator to start the polymerization. The reaction was continued for 15 hours while adding a mixture of 2F/3FH/6F=70/25/5 (molar ratio) to the reaction mixture to compensate the pressure drop due to the progress of the polymerization.

After the completion of the reaction, unreacted monomers and R-113 were removed and the reaction product was washed and dried at 100° C. to obtain 4.5 kg of a desired polymer having an intrinsic viscosity of 0.73.

The structure of the polymer was analysed with NMR spectrography and various properties are measured by the following methods:

(1) Decomposition Temperature ($T_D$)

Using a differential thermal balance (Model DTG-30, product of Shimadzu Seisakusho, Japan), the temperature at which the weight of the polymer started to reduce was measured while elevating the temperature at a rate of 10° C./min.

(2) Refractive Index ($n_D$)

Measured at 25° C. with Abbe refractometer (product of Atago Kogakukiki Mfg. Co., Ltd., Japan).

(3) Melt Flow Index (MI)

Using a melt indexer (product of Takara Kogyo Kabushiki Kaisha, Japan), the polymer was extruded at a temperature of 230° C. and a load of 2.1 kg. The MI value is defined as the amount in gram of the polymer extruded for a period of 10 minutes.

(4) Glass Transition Temperature (Tg)

Using a differential scanning calorimeter (Model DSC II, product of Perkin Elmer Co., U.S.A.), the temperature at which the polymer started to absorb heat was measure while elevating the temperature at a rate of 20° C./min.

TABLE 1

| | |
|---|---|
| $T_D$ | 348° C. |
| $n_D$ | 1.391 |
| MI | 15 |
| Tg | 110° C. |
| $^{19}$F-NMR (mol. %) | 2F/3FH/6F = 71/24/5 |

REFERENCE EXAMPLE 2

Into a 40-1 autoclave equipped with a stirrer was placed 8 l of water. After the deaeration and nitrogen replacement were repeated three times, 9 l of R-113, 430 g of perfluoro(propylvinylether) (hereinafter referred to as "C3VE"), 350 g of 3FH and 2,177 g of 2F were introduced into the autoclave one after another and the mixture was maintained at a temperature of 17° C. To the mixture was then added 100 ml of ethyl acetate as chain transfer agent and 25 g of DHP as polymerization initiator to start the polymerization. The reaction was continued for 20 hours while adding a mixture of 2F/3FH/C3VE=82.5/13/4.5 (molar ratio) to the reaction mixture to compensate the pressure drop in the autoclave due to the progress of the polymerization.

After the completion of the reaction, unreacted monomers and R-113 were removed and the reaction product was washed and dried at 100° C. to obtain 4.1 kg of a terpolymer having an intrinsic viscosity of 0.75.

The structure and the properties of the polymer determined by the same procedures as in Reference Example 1 are given in Table 2 below.

TABLE 2

| | |
|---|---|
| $T_D$ | 346° C. |
| $n_D$ | 1.392 |
| MI | 16 |
| Tg | 112° C. |
| $^{19}$F-NMR (mol. %) | 2F/3FH/C3VE = 83/13/4 |

EXAMPLE 1

To an extruder equipped with a vent and heated at 250° C. was introduced PMMA ("Acrypet", product of Mitsubishi Rayon Kabushikikaisha, Japan) and the PMMA was extruded from the central aperture of the double extruding nozzle as a core 1 mm in diameter while extruding the terpolymer obtained in Reference Example 1 from the outer aperture of the double nozzle as the cladding to form a strand for optical fiber consisting of the core and the cladding. The weight ratio of PMMA/terpolymer was 95/5.

The strand thus obtained was drawn to a length of 1.7 times the original length to produce an optical fiber.

The transmission loss of the fiber measured at 25° C. and 85° C. using light 650 nm in wavelength was 165 dB/km and 180 dB/km, respectively.

After the optical fiber produced as above was heat treated under the conditions of 85° C. and 95% RH for 1,000 hours, the fiber was checked for the transmission loss in the same manner as above. The loss was 300 dB/km at 85° C. The result shows that the optical fiber of the invention is excellent in heat resistance.

The optical fiber produced as above was wound around round steel rods of varying radii to determine the minimum radius of the rod on which cracks would develop in the fiber. The fiber could be wound around a rod of 5 mm in diameter without developing cracks.

EXAMPLE 2

Optical fibers 0.78 mm in diameter were produced in a similar manner as in Example 1 except that the cladding was formed with the terpolymer obtained in Reference Example 2.

The transmission loss of the fiber for a light with 650 nm in wavelength at 25° C. and 85° C. was 165 dB/km and 185 dB/km, respectively.

After heat treatment under the conditions of 85° C. and 95% RH for 1,000 hours, the optical fiber gave a transmission loss of 320 dB/km at 85° C.

The fiber could be wound around a rod 5 mm in diameter without developing cracks.

COMPARISON EXAMPLE 1

Optical fibers 0.78 mm in diameter were produced in a similar manner as in Example 1 except that the cladding was formed with a copolymer (MI=16) consisting of 80 mol. % of vinylidene fluoride and 20 mol. % of tetrafluoroethylene.

The transmission loss of the optical fiber for a light of 650 nm in wavelength at 25° C. and 85° C. was 195 dB/km and 290 dB/km, respectively, After heat treatment under the conditions of 85° C. and 95% RH for 1,000 hours, the transmission loss was found to have greatly increased to a value of 1,200 dB/km.

The fiber could only be wound around a rod 8 mm in diameter without developing cracks.

We claim:

1. In an optical fiber comprising a cladding and a core, an improvement wherein the cladding comprises a terpolymer consisting essentially of:
   (1) about 50 to about 90 mol. % of vinylidene fluoride,
   (2) about 8 to about 45 mol. % of trifluoroethylene and
   (3) about 2 to about 15 mol. % of hexafluoropropylene or perfluoro(alkylvinylether).

2. An optical fiber according to claim 1 wherein the terpolymer forming the cladding has a melt flow-index (MI) of about 2 to about 100.

3. An optical fiber according to claim 2 wherein the terpolymer has a MI of about 10 to about 100.

4. An optical fiber according to claim 1 wherein the terpolymer forming the cladding has a refractive index of about 1.35 to about 1.42.

5. An optical fiber according to claim 4 wherein the terpolymer has a refractive index of about 1.37 to about 1.41.

6. An optical fiber according to claim 1 wherein the core is formed of a plastics material.

7. An optical fiber according to claim 6 wherein the core is formed of PMMA.

8. An optical fiber according to claim 1 wherein the core is formed of a glass material.

* * * * *